United States Patent [19]

Owen

[11] Patent Number: 5,794,946
[45] Date of Patent: Aug. 18, 1998

[54] SPIRAL WOUND GASKET

[75] Inventor: Richard Scott Owen, Houston, Tex.

[73] Assignee: Lamons Metal Gasket Co., Houston, Tex.

[21] Appl. No.: 914,699

[22] Filed: Aug. 19, 1997

Related U.S. Application Data

[63] Continuation of Ser. No. 651,691, May 21, 1996, abandoned.

[51] Int. Cl.⁶ .................................................. F16J 15/12
[52] U.S. Cl. ........................... 277/610; 277/627; 277/633; 277/639
[58] Field of Search .................................. 277/610, 627, 277/633, 639

[56] References Cited

U.S. PATENT DOCUMENTS

| | | |
|---|---|---|
| Re. 29,702 | 7/1978 | Owen et al. . |
| 1,100,182 | 6/1914 | Hettinger . |
| 1,636,363 | 7/1927 | Hettinger . |
| 1,942,703 | 1/1934 | Hubbard et al. . |
| 2,196,953 | 4/1940 | Bohmer, Jr. et al. . |
| 2,200,212 | 5/1940 | Bohmer, Jr. et al. . |
| 2,339,478 | 1/1944 | Hoheisel .................... 277/204 |
| 2,339,479 | 1/1944 | McCreary . |
| 2,520,089 | 8/1950 | Lippincott . |
| 2,809,080 | 10/1957 | Mittell et al. . |
| 2,827,320 | 3/1958 | Kane . |
| 2,828,987 | 4/1958 | Schmitz . |
| 2,882,083 | 4/1959 | Palumbo et al. . |
| 3,529,836 | 9/1970 | Hyde . |
| 3,556,541 | 1/1971 | Salono . |
| 3,573,873 | 4/1971 | Pearson . |
| 3,815,927 | 6/1974 | Geipel . |
| 3,926,445 | 12/1975 | Farnam . |
| 4,019,244 | 4/1977 | Owen et al. . |
| 4,189,819 | 2/1980 | Nicholson . |
| 4,364,982 | 12/1982 | Gee . |
| 4,455,334 | 6/1984 | Ogino et al. . |
| 4,673,187 | 6/1987 | Hanson et al. . |
| 4,826,181 | 5/1989 | Howard . |
| 5,161,807 | 11/1992 | Allen et al. . |
| 5,275,423 | 1/1994 | Allen et al. . |

FOREIGN PATENT DOCUMENTS 1213243  11/1970  United Kingdom .................. 277/204

*Primary Examiner*—Daniel G. DePumpo
*Attorney, Agent, or Firm*—Edgar A. Zarins; Malcolm L. Sutherland

[57] ABSTRACT

A spiral wound gasket able to compress and seal under various loads and provide sealing capabilities. The gasket generally includes a spiral wound portion and an outer guide ring to limit the compression of the gasket. The spiral winding is formed of interdisposed windings of a metal and an elastomer sealant. The metal winding has a non-planar cross-section to inhibit buckling under compression. The gasket is dimensioned such that the elastomer sealant winding has a width greater than the width of the metal winding which has a width greater than the thickness of the guide ring. In this manner, the sealant is compressed before compression of the metal winding which can be compressed until the outer guide ring is encountered.

7 Claims, 2 Drawing Sheets

SPIRAL WOUND GASKET

This application is a continuation, of application Ser. No. 08/651,691 filed May 21, 1996, now abandoned.

BACKGROUND OF THE INVENTION

1. Field of the Invention

This invention relates to spiral wound gaskets for sealing between pipe flanges and, in particular, to a spiral wound gasket which incorporates an interposed sealant material of greater width than the metal winding for improved sealing properties under low loads.

2. Description of the Prior Art

Spiral wound gaskets are well known for sealing between pipe flanges in high fluid pressure applications. Typically such gaskets include a spiral winding and a metal guide ring. The spiral winding is usually a profiled metal strip and a sealing material spiral wound upon itself to form a laminated structure which is resilient in a direction perpendicular to the plane of the spiral. The guide ring attached to the spiral winding is designed to prevent over-compression of the spiral winding as the pipe flanges are clamped together and to center the gasket within the flange. A metal support ring may be provided radially inward of the spiral winding to limit compression and buckling. These rings are flat metal rings with a typical thickness less than the non-compressed thickness of the spiral winding.

The metal winding section of prior known spiral gaskets is designed to seal against fluid leakage while the metal guide ring simply limits compression of the gasket and facilitates location of the gasket within the flange. The flat metal guide ring of the prior known gaskets has no sealing function because that is the task of the spiral winding. While the guide ring forms an outer metal annuli, some spiral wound gaskets also include an inner ring to limit compression and inward buckling. In order to provide sealing only through the elastomer sealing material, prior known gaskets incorporate spiral windings with metal windings equal in width to the guide ring and sealant strips with a width which projects axially beyond the metal windings. In other words, the sealant material is wider than the width of the metal turns and the guide ring. As a result, the metal windings are not compressed between the pipe flanges and the elastomer sealant prevents leakage. However, it has been determined that the metal windings can provide sealing advantages particularly when compressed along with the sealant layers.

SUMMARY OF THE PRESENT INVENTION

The present invention overcomes the disadvantages of the prior known spiral wound gaskets by providing sealant winding wider than the metal winding which is wider than the guide ring for improved sealing capabilities particularly in low load applications.

The general configuration of the spiral wound gasket of the present invention includes a spiral winding formed from alternating layers of a metal strip and an elastomer sealant material which is interdisposed between the layers of the metal strip. In a preferred embodiment, the individual bands of the spiral winding have a non-planar profile to prevent buckling upon compression within the pipe flange. Secured to the outer periphery of the winding is a flat guide ring which limits the compression of the gasket. As used herein, the width of the guide ring and winding refers to the axial dimension of each component.

In a preferred embodiment of the present invention, the spiral wound gasket comprises an outer guide ring and a winding of metal and a sealant. The guide ring has a predetermined axial width according to the intended application of the gasket. The metal winding has a predetermined width greater than the thickness of the guide ring so as to be compressed by the pipe flanges. The winding of sealant material interdisposed between the metal winding has a predetermined width greater than the width of the metal winding for improved sealing during compression. The guide ring preferably has a width between 0.115 inches and 0.125 inches. The metal winding has a width between 0.150 and 0.160 inches. The elastomer sealant winding has a width between 0.175 and 0.185 inches.

These embodiments provide significant advantages over prior known spiral wound gaskets including greater durability than present low load designs, low sealing load requirements, dual or triple sealing surfaces and the reduction or elimination of the tendency of the spiral wound gaskets to buckle towards the inside diameter. These advantages are attained while maintaining the compressed thickness of the gasket similar to traditional gaskets or whatever overall compressed thickness is desirable.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
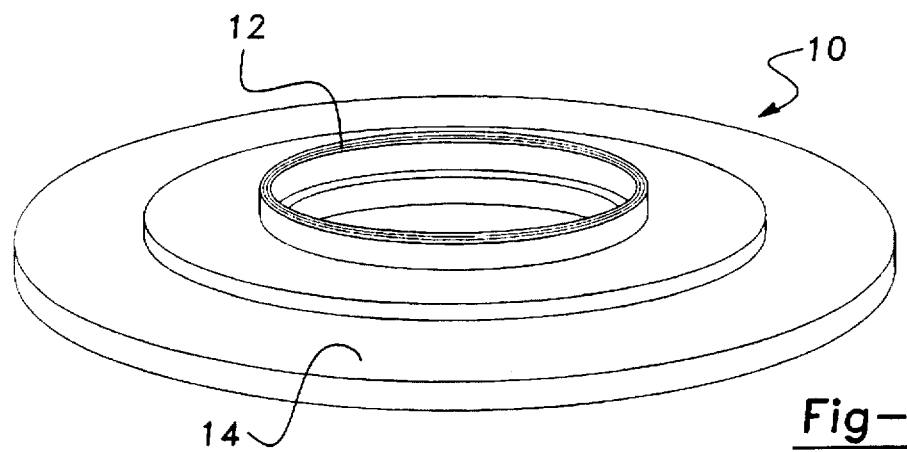
FIG. 1 is a perspective view of a spiral wound gasket embodying the present invention.

Referring first to FIG. 1, there is shown a perspective view of a spiral wound gasket 10 adapted to be disposed between flanges of a pipe or vessel to prevent fluid leakage. Sections of pipe are connected to form a pipeline to direct various fluids from one location to another. To facilitate connection of the pipes, flanges are formed on the ends which may be connected to a subsequent pipe flange using a plurality of bolts. The spiral wound gasket 10 is inserted between the flanges to prevent fluid leakage. As is well known, the gasket 10 generally includes a spiral wound section 12 which provides the sealing capability and a solid guide ring 14 which limits compression and locates the gasket 10 between the pipe flanges.

Figure 2:
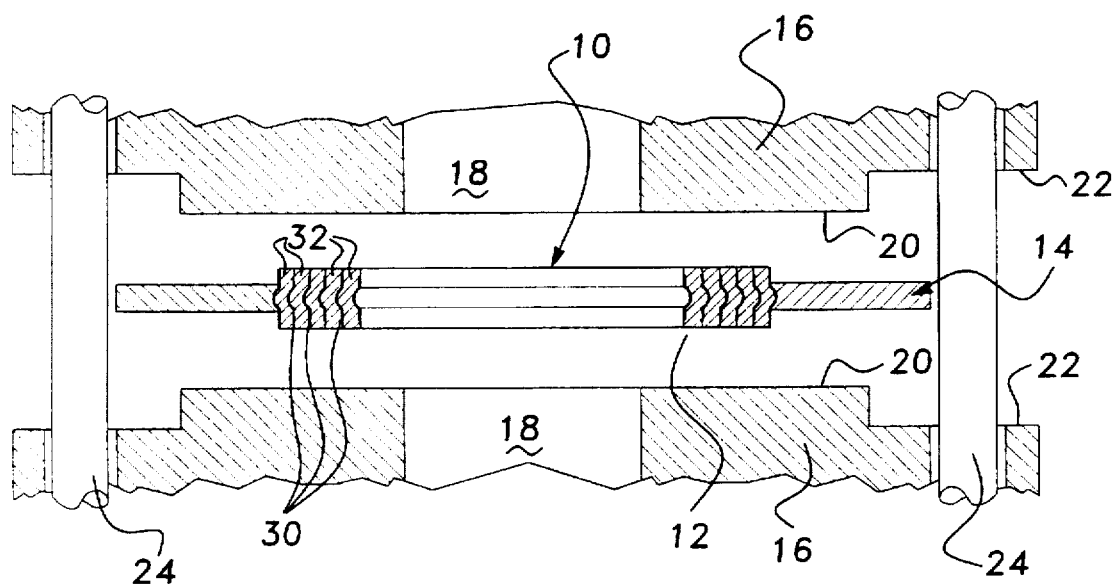
FIG. 2 is a cross-sectional view of the spiral wound gasket positioned between pipe flanges.
Figure 3:
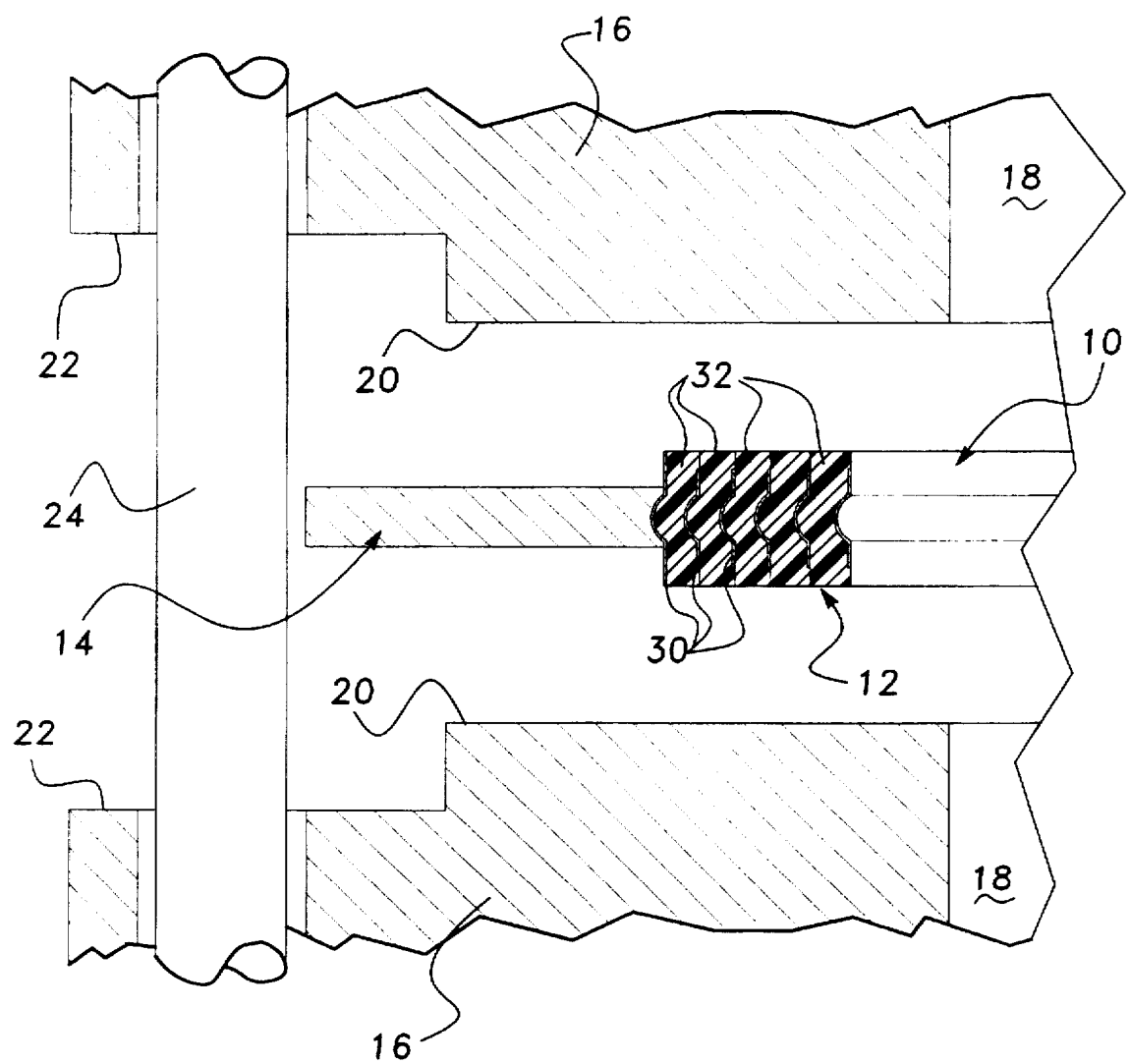
FIG. 3 is an enlarged partial cross-sectional view of the spiral wound gasket.

FIGS. 2 and 3 illustrate the spiral wound gasket 10 disposed between a pair of adjacent pipe flanges 16 each having a throughbore 18 for fluid flow. Typically, the flanges 16 have a raised face 20 creating a peripheral shoulder 22. A plurality of bolts 24 for securing the flanges 16 extend through this peripheral portion such that the necessary loads can be applied to the gasket 10 surrounding the throughbore 18 without interference proximate the bolts 24. The load applied to the gasket 10 sandwiched between the flanges 16 is a result of the tightening of the bolts 24. In some applications, the bolts 24 are not tightened to full torque but the seam between the flanges 16 must still not leak fluids.

Referring now to FIGS. 2 and 3, the gasket 10 includes a winding 12 comprising a metal band or wire 30 having a first predetermined width with a sealant strip 32 of a greater width interspersed between the metal windings 30 to form a laminated winding. The metal strip 30 acts as a resilient supporting material and preferably has a curved profile to act as a spring and retard buckling during compression. In a preferred embodiment, the metal winding 30 has a width of between 0.150 inches and 0.160 inches while the elastomer strip 32 has a width of between 0.175 and 0.185 inches depending upon the application. The width of the metal winding 30 is significantly greater than the thickness of the metal guide ring 14.

The guide ring 14 limits the compression of the winding 12 by acting as a hard stop between the flanges 16. The axial width of the guide ring 14 of the present invention is preferably less than the width of the metal and elastomer winding 12. In the preferred embodiment, the metal portion of the guide ring 14 has a width of between 0.115 inches and 0.125 inches. Accordingly, the metal winding of the spiral winding are wider than the outer guide ring and the elastomer windings are wider than the metal windings. Under strict manufacturing tolerances, the preferred dimensions of the gasket 10 include an outer guide ring 14 with a width of 0.120 inches, metal windings 30 with a width of 0.155 inches and elastomer windings 32 with a width of 0.180 inches. As a result, with the gasket 20 mounted between the flanges 16, the elastomer windings 32 will be compressed first before compression of the metal windings 30 begins. Thereafter, compression of both the metal and elastomer of the winding 12 will continue until the compression limit created by the guide ring 14 is engaged.

The foregoing detailed description has been given for clearness of understanding only and no unnecessary limitations should be understood therefrom as some modifications will be obvious to those skilled in the art without departing from the scope and spirit of the appended claims.

What is claimed is:

1. A spiral wound gasket for low load sealing of a fluid conductor, said gasket comprising:

of multiple windings forming a spiral gasket ring, said spiral gasket ring including interspersed windings of metal having a predetermined width and a sealant having a width greater than said width of said metal winding;

an outer guide ring mounted to an outer periphery of said spiral gasket ring;

said guide ring having a predetermined axial width, said metal windings have width greater than the axial width of said outer guide ring such that said metal winding projects a significant distance on both sides of said guide ring and said sealant winding protecting a significant distance on both sides of said metal winding.

2. The gasket as defined in claim 1 wherein said outer guide ring has a width in the range of 0.115 to 0.125 inches, said metal winding has a width in the range of 0.150 to 0.160 inches, and said sealant winding has a width in the range of 0.175 to 0.185 inches.

3. The gasket as defined in claim 2 wherein said outer guide ring has a width of 0.120 inches, said metal winding has a width of 0.155 inches, and said sealant winding has a width of 0.180 inches.

4. The gasket as defined in claim 2 wherein said sealant winding is made of a flexible graphite.

5. A spiral wound gasket for sealing of a fluid conductor, said gasket comprising:

multiple windings forming a spiral gasket ring, said spiral gasket ring including interspersed windings of metal and a gasket material, said metal winding and said gasket winding each having a predetermined width; and an outer guide ring mounted to an outer periphery of said spiral gasket ring, said guide ring having a predetermined axial width;

said metal winding having a width greater than the axial width of said guide ring wherein said metal winding projects a significant distance on both sides of said guide ring and said gasket winding having a width greater than the width of said metal winding wherein said gasket winding projects a significant distance on both sides of said metal winding.

6. The gasket as defined in claim 5 wherein said outer guide ring has a width in the range of 0.115 to 0.125 inches, said metal winding has a width in the range of 0.150 to 0.160 inches, and said sealant winding has a width in the range of 0.175 to 0.185 inches.

7. The gasket as defined in claim 5 wherein said outer guide ring has a width of 0.120 inches, said metal winding has a width of 0.155 inches, and said sealant winding has a width of 0.180 inches.

* * * * *